(12) United States Patent
Blondel et al.

(10) Patent No.: US 8,698,530 B2
(45) Date of Patent: Apr. 15, 2014

(54) HIGH PRECISION SYNCHRONISATION METHOD AND SYSTEM

(75) Inventors: Thomas Blondel, Velizy (FR); Simona Di Simone, Vimercate (IT)

(73) Assignee: Alcatel Lucent, Paris (FR)

( * ) Notice: Subject to any disclaimer, the term of this patent is extended or adjusted under 35 U.S.C. 154(b) by 231 days.

(21) Appl. No.: 13/384,812

(22) PCT Filed: Jul. 2, 2010

(86) PCT No.: PCT/EP2010/059485
§ 371 (c)(1),
(2), (4) Date: Feb. 17, 2012

(87) PCT Pub. No.: WO2011/009707
PCT Pub. Date: Jan. 27, 2011

(65) Prior Publication Data
US 2012/0139597 A1    Jun. 7, 2012

(30) Foreign Application Priority Data
Jul. 24, 2009  (FR) ........................... 09 03673

(51) Int. Cl.
*H03L 7/00* (2006.01)
(52) U.S. Cl.
USPC ......................................... 327/162
(58) Field of Classification Search
USPC ......................................... 327/162
See application file for complete search history.

(56) References Cited

U.S. PATENT DOCUMENTS

| 5,742,649 | A  | * | 4/1998  | Muntz et al. ............... 375/371 |
| 6,122,337 | A  | * | 9/2000  | Bleiweiss et al. ....... 370/395.62 |
| 8,284,888 | B2 | * | 10/2012 | Kyles ........................... 375/376 |
| 2006/0156065 | A1 | * | 7/2006  | Glass ........................... 714/18 |
| 2010/0118895 | A1 | * | 5/2010  | Radulescu ................ 370/503 |

FOREIGN PATENT DOCUMENTS

EP    0667727    8/1995

* cited by examiner

*Primary Examiner* — Lincoln Donovan
*Assistant Examiner* — Khareem E Almo
(74) *Attorney, Agent, or Firm* — Carmen Patti Law Group, LLC

(57) ABSTRACT

Method of synchronizing clocks between a first reference clock and a second clock to be slaved on the frequency of the reference clock, the two sharing a common clock, this method comprising the following steps:
  calculation of the integer part of the timestamp using the reference clock and the common clock;
  generation of a system clock local to the reference clock;
  calculation of the phase shift between the system clock signal and the reference clock signal;
  calculation of the phase shift between the system clock signal and the common clock signal;
  calculation of the decimal part of the timestamp;
  sending of the decimal timestamp to the second clock;
  slaving of the second clock using the common clock and the timestamp received.

9 Claims, 1 Drawing Sheet

HIGH PRECISION SYNCHRONISATION METHOD AND SYSTEM

Figure 1:
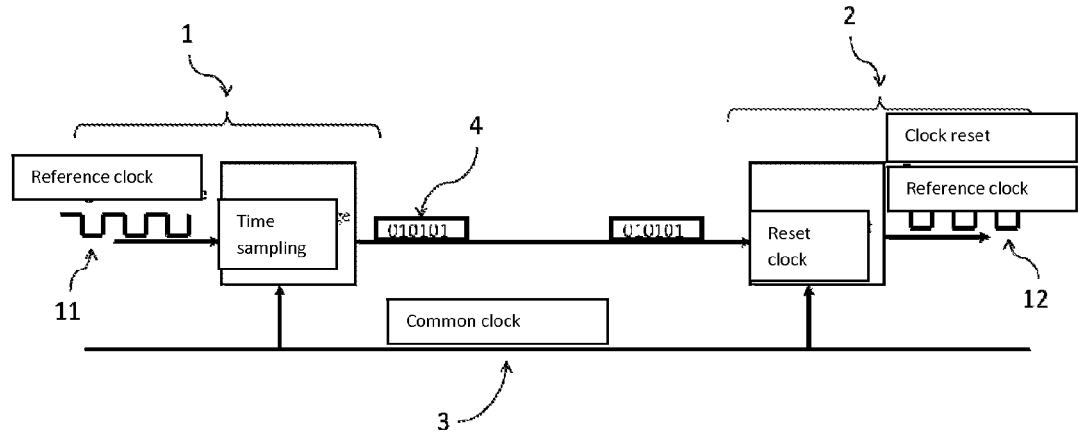

This invention pertains to the technical field of time data management and more particularly clock synchronisation.

Synchronisation is one of the key issues essential for the correct operation of real time applications within distributed systems. A "distributed system" is any networked set of entities communicating through this network, such as a communication network (wire or mobile), a computer network or a multiprocessor hardware architecture. Furthermore, in the following, an "entity" refers to any processor, application, node, or more generally a method or system requiring time information.

Usually, in a distributed system, a distinction is made between a plurality of entities requiring a common time concept. The first steps to achieve this are:
to refer all entities to a single shared global clock; or
to equip all these entities with perfectly synchronous clocks.

However, the distribution of these entities in space causes different transmission times from one entity to another, which jeopardises the possibility of an instantaneous global view of a shared clock. Furthermore, two clocks that start in phase will never remain synchronous. A short term variation in environmental factors (for example the temperature, pressure, altitude, mobility through the Doppler effect, power supply voltage), or a long term variation such as aging of one clock relative to another clock, cause more or less significant drifts (up to several seconds per day), making the second alternative inaccurate.

Consequently, it is essential to use a method for synchronisation between the entities of a distributed system.

A distinction is made between two approaches for synchronisation of a set of nodes within a distributed system. The first approach is called external synchronisation, and is based on the use of an external reference clock. The second approach is called internal synchronisation, and is aimed at keeping a group of clocks synchronised.

An internal synchronisation method is aimed at converging all clocks in a distributed system to the same time. This is not the real time. This is the time that satisfies a number of compromises between all the clocks.

In an external synchronisation method, the clocks of the different entities of a distributed system attempt to be as close to a common clock (a system clock, or a clock external to the system) as possible. The common clock may for example be set to GPS (Global Positioning System) time or LORAN (LOng RAnge Navigation) time.

A clock comprises mainly an oscillator and a counter. The oscillator regularly generates clock "ticks", at times at which the counter is incremented by one unit. The result is that the number output by the counter needs to be factored to give the time (for example if it is known that 100 ticks correspond to one second, the counter simply has to be divided by 100 to obtain the time in seconds). The oscillator is characterised by an oscillation frequency, and is usually followed by shaping to obtain a square periodic signal. In this case, a clock tick may for example correspond to a rising or descending front of the square signal.

More generally, consider the canonical case of the synchronisation problem, considering synchronisation of two clocks belonging to two communicating entities, one of which is the reference clock for the second entity.

When it is a common clock, the two remote clocks are synchronised by sending the number of ticks from the reference clock as recorded in a time window of the common clock, to the second clock. This number is known as a timestamp. Consequently, the receiving clock adjusts its rhythm using the received timestamp and the common clock.

However, the sent timestamp is a natural integer of the reference clock oscillation cycle, thus ignoring any fraction of a period of the reference clock signal. The result is that the maximum synchronisation precision is of the order of one period of the reference clock.

Known systems and methods are imperfect, particularly due to their low precision. They have a time resolution that cannot be less than the period of the reference clock. They do not enable a detailed description of the number of pulses of the reference clock observed in a time window of the common clock.

One purpose of this invention is to improve the precision of synchronisation between two clocks.

Another purpose of this invention is to reduce the time drift between two entities in a distributed network.

Another purpose of this invention is to obtain a resolution power equal to less than the duration of one cycle of the reference clock.

Another purpose of this invention is to improve the synchronisation precision to fractions of the period of reference clock pulses.

Another purpose of this invention is to reduce jitter in a communication network carrying synchronisation messages.

Another purpose of this invention is to guarantee high synchronisation precision with a small number of timestamps transmitted from the reference clock to the second clock.

Another purpose of this invention is to guarantee high synchronisation precision with a finite observation time window.

Another purpose of this invention is to reduce the extent to which the precision of the synchronisation method is dependent on the frequency of the common clock.

Another purpose of this invention is to define a synchronisation adjustment function.

Another purpose of this invention is to eliminate sources of indeterminacy affecting a synchronisation method, avoiding the need to take an average over several timestamps.

According to a first aspect, this invention discloses a method of synchronising clocks between a first reference clock and a second clock to be slaved on the frequency of the reference clock, the two sharing a common clock, this method comprising the following steps:
calculation of the integer part of the timestamp using the reference clock and the common clock;
generation of a system clock local to the reference clock;
calculation of the phase shift between the system clock signal and the reference clock signal;
calculation of the phase shift between the system clock signal and the common clock signal;
calculation of the decimal part of the timestamp;
sending of the decimal timestamp to the second clock;
slaving of the second clock using the common clock and the timestamp received.

According to a second aspect, the invention discloses a clock synchronisation system between a first reference clock and a second clock to be slaved to the frequency of the reference clock, the two clocks sharing a common clock, this system comprising:
a system clock local to the reference clock; and
a numerically controlled oscillator local to the reference clock.

Figure 2:
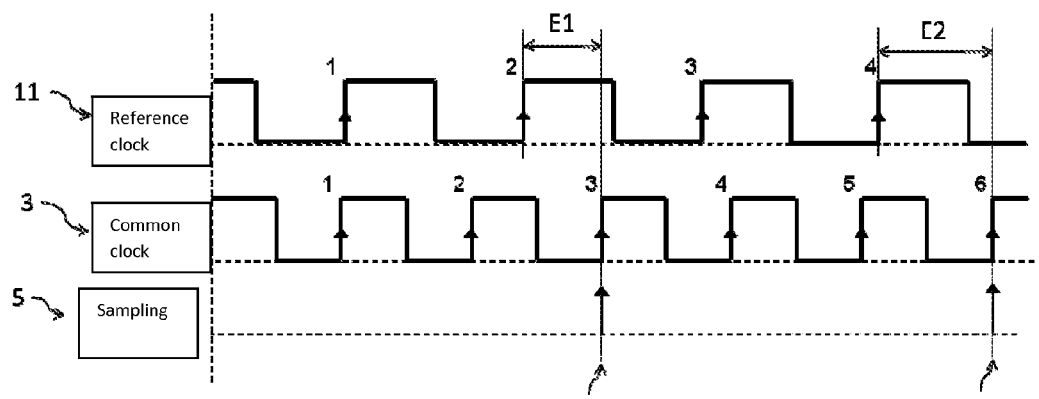
Figure 3:
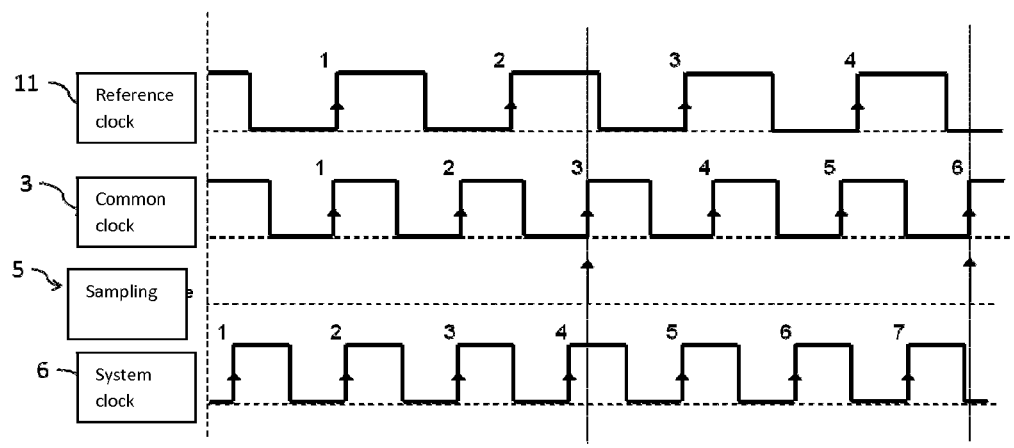

Other characteristics and advantages of the invention will become more clearly and completely apparent upon reading the description below of preferred embodiments, which is done with reference to the attached drawings in which:

FIGS. 1 and 2 diagrammatically show the state of the art;

FIG. 3 diagrammatically shows a method of calculating the timestamp according to this invention.

In the following description of a high precision clock synchronisation method and system, it is assumed that a distributed system comprises at least a first entity 1, of which the clock 11 will be used as reference for at least one second entity 2, equipped in turn with a clock 12; and a common clock 3. Examples of common clocks include GPS (Global Positioning System) time, LORAN (LOng RAnge Navigation) time and any other time deemed to be precise and accessible to entities 1 and 2.

The relation between the two entities is usually referred to as a client-server or master-slave relation in which the clock 12 of the second entity 2 is slaved by clock 11 of the first entity 1. Note that an entity may be master and slave at the same time.

Synchronisation is based on regular transmission of timestamps 4 from the first entity 1 to the second entity 2. A timestamp comprises a representation of a natural integer that reflects an integer number of clock ticks made by the reference clock 11 in an observation time window of the common clock 3.

For example, FIG. 2 shows a reference clock 11 with a given frequency;

a common clock 3 with a frequency that is preferably higher than the frequency of the reference clock, and sampling 5 of the signal from the reference clock 11 at time intervals of the common clock 3. Sampling 5 determines the content of the timestamp 4.

Note that in this example, a clock tick corresponds to any rising front of a clock signal, and the observation time window of the time of the common clock 3 is equal to three times the period of the signal from the common clock 3.

The result is that a timestamp is sent to the second entity 2 every 3 periods of the signal from the common clock 3. The timestamp 4 deduced at sampling times 51 and 52 is equal to 2 and 4 respectively. The timestamp 4 corresponds to the number of rising fronts in the signal from the reference clock 11 identified in the observation window, expressed as a number of periods of the common clock 3.

In one variant, the timestamp 4 comprises the number of rising fronts detected since the most recent sent timestamp. In this case, the value of the timestamp at sampling times 51 and 52 is equal to 2 and 2 respectively.

Note that the recorded values of the imprecision of E1 and E2 at sampling times are 51 and 52, respectively. These imprecisions are fractions of the period of the signal from the reference clock 11.

E1 and E2 represent the phase shift between the signal from the reference clock 11 and the signal from the common clock 3 at sampling times 51 and 52 respectively.

Therefore, E is the sum of the fractions of the period of the signal from the reference clock not considered by the timestamp 4 in an observation window. Note that this sum is algebraic, in other words at the end of an observation window, there may be a plus or minus fraction of the period of the signal from the reference clock 11.

A system clock 6 local to the reference clock 11 is used to take account of the fractions E of the period of the signal from the reference clock 11, as shown in FIG. 3.

The frequency of the system clock 6 is higher than or equal to the reference clock 11. Such a clock may be easily managed by an FPGA (Field-Programmable Gate Array) provided with a local clock preferably desynchronised from the common clock 3 and the reference clock 11.

The system clock 6 quantifies fractions E with a period of the reference clock 11 observed in a time window of the common clock 3.

To this end, an NCO (Numerically-Controlled oscillator) is used to calculate:

the phase shift between the system clock 6 and the reference clock 11; and the phase shift between the system clock 6 and the common clock 3.

Using the NCO in this way allows for the phase of the oscillations of a clock in addition to the rising fronts.

A counter is associated with each phase shift calculation. The first counter is incremented at each rising front of the system clock 6 with a step equal to the ratio between the period of the signal from the system clock 6 and the period of the signal from the reference clock 11. The second counter is incremented at each rising front of the system clock 6 with a step equal to the ratio between the period of the signal from the system clock 6 and the period of the signal from the common clock 3.

At each sampling time 51, 52, the decimal part of the timestamp to be sent is deduced from these phase shifts between the system clock 6 and the system clock 11, and between the system clock 6 and the common clock 3 respectively.

The decimal part of the timestamp to be sent is equal to the decimal part of the quantity obtained by subtracting the "first counter increment step" multiplied by "the ratio between the frequency of the reference clock 11 and the frequency of the common clock 3", from the value of the first counter at the sampling time.

The timestamp to be sent to the second clock 12 to be slaved on the frequency of the reference clock 11 is composed of a first integer part given by the number of rising fronts in a time window of the common clock; and a decimal part deduced from the phase shift between the signal from the system clock 6 and the reference clock 11 and the phase shift between the system clock 6 and the common clock 3.

As a variant, the value of the timestamp is given by the difference between the values calculated in two successive sampling times, using the values of the first and second counters.

Note that the system clock enables oversampling of the signal from the reference clock 11 and the signal from the common clock 3, resulting in a better description and therefore better precision of the synchronisation method.

A more detailed quantification of the ticks of the reference clock 11 in a finite observation time window is made using a timestamp with a decimal value.

Note that such added precision is dependent on the number of bits available to code the decimal part.

In reception, the second receiving entity 2 finds the oscillation frequency of the reference clock 11 using a PLL (Phase-Locked Loop). This PLL slaves the frequency of the clock 12 in the second entity 2 to the frequency of the reference clock 11.

Note that other processing may be added to this synchronisation method to take account of disturbances due to the transmission channel such as packet delay variations, or packet loss.

The invention claimed is:

1. Method for clock synchronisation between a first reference clock and a second clock to be slaved to the reference clock frequency, the two sharing a common clock, this method being characterised in that it comprises the following steps
- calculation of the integer part of the timestamp using the reference clock and the common clock;
- generation of a system clock local to the reference clock;
- calculation of the phase shift between the system clock signal and the reference clock signal;
- calculation of the phase shift between the system clock signal and the common clock signal;
- calculation of the decimal part of the timestamp;
- sending of the decimal timestamp to the second clock;
- slaving of the second clock using the common clock and the timestamp received.

2. Method according to claim 1, characterised in that the system clock is desynchronised from the reference clock and the common clock.

3. Method according to claim 1, characterised in that the frequency of the system clock is higher than or equal to the reference clock.

4. Method according to claim 1, characterised in that the phase shift between the signal of the system clock and the signal of the reference clock or the signal of the common clock is calculated using a numerically controlled oscillator.

5. Method according to claim 1, characterised in that the system clock is managed by a field-programmable gate array.

6. Clock synchronisation system between a first reference clock and a second clock to be slaved on the frequency of the reference clock, the two sharing a common clock, this system being characterised in that it comprises:
- a system clock local to the reference clock; and
- a numerically controlled oscillator local to the reference clock.

7. System according to claim 6, characterised in that the system clock is managed by field-programmable gate array.

8. System according to claim 6, characterised in that the numerically controlled oscillator calculates the phase shift between the system clock signal and the reference clock signal.

9. System according to claim 6, characterised in that the numerically controlled oscillator calculates the phase shift between the system clock signal and the common clock signal.

* * * * *